United States Patent
Schumacher et al.

(10) Patent No.: US 8,070,233 B2
(45) Date of Patent: Dec. 6, 2011

(54) DOWNWARDS FOLDING SEAT

(75) Inventors: Markus Schumacher, Buxtehude (DE); Andrew Muin, Harsefeld (DE)

(73) Assignee: Airbus Deutschland GmbH (DE)

( * ) Notice: Subject to any disclaimer, the term of this patent is extended or adjusted under 35 U.S.C. 154(b) by 0 days.

(21) Appl. No.: 12/319,969

(22) Filed: Jan. 14, 2009

(65) Prior Publication Data

US 2009/0127911 A1    May 21, 2009

Related U.S. Application Data

(62) Division of application No. 11/079,607, filed on Mar. 14, 2005, now abandoned.

(60) Provisional application No. 60/598,253, filed on Aug. 3, 2004.

(30) Foreign Application Priority Data

Mar. 15, 2004    (DE) .......................... 10 2004 012 480

(51) Int. Cl.
   *B60N 2/46* (2006.01)
(52) U.S. Cl. ..................... 297/411.32; 297/323; 297/335
(58) Field of Classification Search ............... 297/411.3, 297/411.32, 411.37, 323, 335
   See application file for complete search history.

(56) References Cited

U.S. PATENT DOCUMENTS

| 196,036 A | 10/1877 | Nolan |
| 2,481,133 A * | 9/1949 | Luketa ....................... 297/423.2 |
| 2,608,239 A * | 8/1952 | Gorden ...................... 297/344.2 |
| 3,594,037 A | 7/1971 | Sherman |
| 4,040,665 A | 8/1977 | Wallace et al. |
| 4,881,778 A | 11/1989 | Stephenson et al. |
| 5,829,836 A | 11/1998 | Schumacher et al. |
| 6,776,457 B2 | 8/2004 | Muin et al. |
| 7,063,387 B2 | 6/2006 | Herault et al. |
| 2003/0209929 A1 | 11/2003 | Muin et al. |
| 2006/0119160 A1 | 6/2006 | Ruspa |

FOREIGN PATENT DOCUMENTS

| DE | 195 34 024 C2 | 7/1997 |
| DE | 102 14 104 C1 | 11/2003 |
| FR | 651808 | 2/1929 |
| FR | 673699 | 1/1930 |
| FR | 2790927 | 9/2000 |
| GB | 2 361 865 A | 7/2001 |
| JP | 59124745 A | 7/1984 |
| JP | 05-091957 A | 12/1993 |
| JP | 08-299094 A | 11/1996 |
| JP | 200043622 A | 3/2002 |
| JP | 2003291696 A | 10/2003 |

OTHER PUBLICATIONS

European Office Action, dated May 19, 2008.
Office Action from Japanese application No. 2005-115074, dated Jan. 24, 2011.

* cited by examiner

*Primary Examiner* — Peter R. Brown

(74) *Attorney, Agent, or Firm* — Lerner, David, Littenberg, Krumholz & Mentlik, LLP

(57) ABSTRACT

A folding seat for an aircraft has a backrest, a seat area and an armrest. The seat area is pivotable. When the seat area is pivoted, the armrest is pivotable downwards, the seat area and the armrest being coupled by at least one coupling element in the form of a bevel gear.

7 Claims, 8 Drawing Sheets

DOWNWARDS FOLDING SEAT

CROSS-REFERENCE TO RELATED APPLICATIONS

This application is a divisional of U.S. application Ser. No. 11/079,607, filed Mar. 14, 2005, which claims the benefit of the filing date of German Patent Application No. 10 2004 012 480.9 filed Mar. 15, 2004 and of U.S. Provisional Patent Application No. 60/598,253 filed Aug. 3, 2004, the disclosures of which are hereby incorporated herein by reference.

BACKGROUND OF THE INVENTION

The present invention relates to a folding seat, particularly for a passenger cabin of an aircraft. In particular, the present invention relates to a folding seat for an aircraft, a seat group for a vehicle, an aircraft having a respective folding seat, as well as a method for guiding passengers to a seat of an aircraft.

Conventional passenger seats for aircraft have a support frame with a seat area, which is fixedly disposed thereon, and a backrest, which is disposed in the region of the back edge of the seat area. In aircraft, the passenger seats, preferably, form rows of seats, wherein two or more adjacently disposed passenger-seats or seats may be combined into a seat group, which is supported by a common support frame. Usually, an armrest is arranged at each side of a seat. The seat groups are provided as stiff units for the installation in the passenger cabins of the aircraft. In this respect, according to the requirements of the airlines, varying configurations may result, a highest possible capacity of seats being primarily aspired. One disadvantage of a passenger cabin having a great number of seats is that, due to the narrow longitudinal corridors of the cabin, also referred to as traffic area, between the rows of seats, the entrance and exit of the passengers require a high amount of time. Stagnation may particularly arise, if, in order to store their hand luggage in compartments above the seats, for example, the passengers remain standing in the corridor, whereby this will be blocked. Usually, the cabin corridors are too narrow to allow for a passage of two air passengers one besides the other. Particularly, a space between the rows of seats is difficult to access during cleaning works as well.

The ground time between consecutive flights of an aircraft, also referred to as "turn around" time, is of essential importance for the profitability of a commercial aircraft. Therefore, it is necessary that also in case of a high occupancy of seats in the passenger cabin, the traffic area be designed in such a way that a fast entrance and exit of the passengers is allowed for, and the amount of time for necessary ground works is minimized.

SUMMARY OF THE INVENTION

According to an exemplary embodiment of the present invention, a folding seat for an aircraft is provided, comprising a backrest, a seat area and an armrest. The seat area may be pivotable. During a pivoting of the seat area, the armrest may be pivotable downwards.

This may allow for an increase of the traffic area, i.e. the areas in the passenger cabin of an aircraft, where the persons may move, particularly during entering and leaving the aircraft. For example, in order to store the luggage in compartments above the seats or below the seats, a passenger may step between two adjacent rows of seats and thereby empty the corridor so that further passengers may go to their seats. This may be made possible in that both, the seat area is pivoted away, and the armrest of the seat may be pivoted away so that there remains still enough space for a person to stand between two consecutively disposed seats.

According to an exemplary embodiment of the present invention, a traffic area of an aircraft may be increased, particularly during a rest on the ground.

According to a further exemplary embodiment of the present invention, a pivoting of the seat area against the backrest may cause a downwards pivoting of the armrest. This folding seat may allow, for example, a simple handling, because by means of pivoting or folding of the seat area upwards against the backrest of the seat, the armrest automatically may be pivoted downwards, whereby a simple access to the space between successive seats is allowed for.

According to a further exemplary embodiment of the present invention, the seat area and the armrest may be coupled in a force-closed manner. In this manner, for example, a handling may be simplified in such a way that only one single hand grip is necessary for pivoting seat area and armrest. This may be desired, particularly during cleaning works.

According to a further exemplary embodiment of the present invention, the seat area and the armrest may be coupled by means of at least one coupling element.

According to a further exemplary embodiment of the present invention, the folding seat may be adapted to be disposed at a corridor in an aircraft. The folding seat may, for example, be the corridor seat of a seat group having two, three or several seats. Thereby, the traffic area of the corridor between consecutive rows of seats may be enlarged, in which persons, for example, may step between rows of seats in order to store pieces of luggage.

According to a further exemplary embodiment of the present invention, a seat group for a vehicle is provided, wherein an armrest and a seat area of a seat may be pivotable. The vehicle may, for example, be an aircraft. Particularly in the case of an aircraft, having two seats on each respective side of the corridor, particularly that respective seat of the seat group, which is adjacent to the corridor, may be provided with a pivotable seat area and a pivotable armrest. Thereby, the traffic area of the aircraft may be enlarged, whereby it may be accelerated for passengers to get on and of the aircraft. This may also attribute to a decrease in a time, which is necessary for cleaning the aircraft. In summary, a "turn around"-time of an aircraft may be decreased.

According to a further exemplary embodiment of the present invention, an aircraft is provided, which has a folding seat according to the present invention or a seat group according to the present invention. Such an aircraft may have a reduced "turn around"-time. Moreover, a corridor between adjacent rows of seats may, for example, be designed to be very narrow, because for the passengers to get on and for the passengers to get off, the respective seat areas and armrests at the corridor side may be pivoted away, whereby the total traffic area of the aircraft is increased again.

According to a further exemplary embodiment of the present invention, a method for leading passengers to a seat of an aircraft is presented. In other words, a method of loading or unloading of the aircraft is concerned, i.e. a method to allow for the boarding of passengers to or the deboarding of passengers from an aircraft. According to the present invention, the seat areas and armrests of seats or rows of seats which are disposed in the respective way may be folded upwards or folded away, respectively, whereby a traffic area of the aircraft may be increased.

BRIEF DESCRIPTION OF THE DRAWINGS

In the following, exemplary embodiments of the present invention are described referring to the following figures.

DETAILED DESCRIPTION

Figure 1:
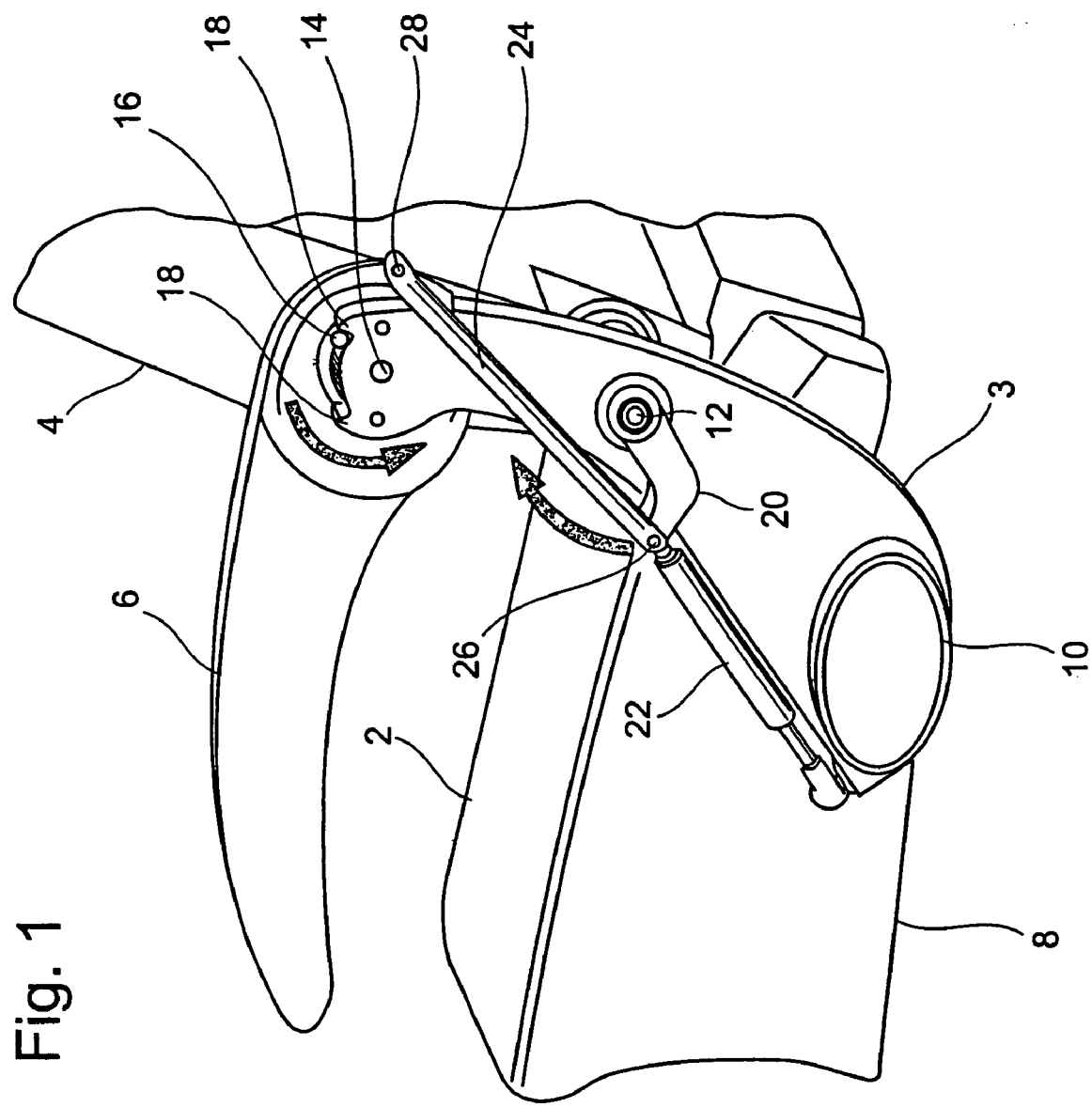
FIG. 1 shows a three dimensional side view of a first embodiment of a folding seat of an aircraft, according to the present invention.

In the following description, the same reference numerals will be used for the same or corresponding elements.

FIG. 1 shows a schematical three dimensional side view of a folding seat for an aircraft, according to the present invention. The seat or folding seat, respectively, comprises a seat area 2, as well as a backrest 4. In FIG. 1, an armrest 6 is shown, which, with respect to the direction of the seat, is situated at the left side of the seat. In FIG. 1, only one armrest 6 is shown. Further, another armrest 6, having substantially the same construction, may be provided in mirror-inverted manner at the right side, with respect to the direction of the seat. Preferably, an armrest of a seat area, facing the corridor, is coupled to the seat area and is downwards pivotable, when the seat area is pivoted upwards. The seat is positioned at a support structure 10, on which the seat area 2 as well as the backrest 4 are positioned. On the support structure 10 a support element 3 is further provided, at which, for example, an axis 12, as well as an axis 14 is provided. For example, the axis 12 may be the pivot axis of the seat area 2 and the backrest 4. On the other hand, according to a further embodiment of the present invention, there may also be provided a separate pivot axis for the seat area 2, in order to allow for an upward movement of the seat area against the backrest 4. In other words, the seat area 2 is folded against the backrest 4 of the seat, either about the axis 12 or about the respective other axis, which is not shown in FIG. 1. The reference numeral 8 refers to a lower side of the seat area 2. For example, the seat area 2 may be provided with a structurally reinforced seat cushion.

If the seat area 2 is in a seating position, i.e. in such a position that a person may sit on it, the armrest 6 may be pivoted, by approximately 90 degrees, about the axis 14 inverse to the arrow direction, as shown in FIG. 1. There is provided a freedom of the pivoting movement by cooperation of two stops 18 and a guide pin 16, which is attached to the armrest 6. The stops 18 are provided at the support element 3.

In other words, the seat area 2 may be folded upwards against the backrest 4, as shown by the arrow in FIG. 1. Further, the armrest 6, which, when the seat is disposed in an aircraft, is preferred to be substantially parallel to a longitudinal direction of the aircraft, when the seat area 2 is in seating position, may be folded upwards or may be disposed in the position shown in FIG. 1, respectively.

At a point 26, the seat area 2 is fixedly connected to a lever 20, which is rotatable about the rotational axis 12. By means of a coupling rod 24, the point 26 is connected to a point 28, and to the armrest 6. The point 28 is disposed at the armrest 6 behind the rotational axis 14, when viewed in the direction of the seat. For example, the points 26 and 28 may be swivel joints, by means of which the coupling rod 24 is connected to the armrest 6 and to the lever 20. When, by means of the lower arrow shown in FIG. 1, the seat area 2 is folded upwards now, the point 26 is displaced along the lower arrow. This displacement takes place along a circular trajectory about the axis 12. This circular trajectory is defined by means of the lever 20. Due to this displacement, by the coupling rod 24, the armrest 6 is turned about the rotational axis 14 in such a way that the armrest 6 is folded downwards. Preferably, in the illustration shown in FIG. 1, the armrest 6 is pivoted away downwards, in a counterclockwise way, by about 90 degrees out of the position shown in FIG. 1, so that it substantially presents a lateral extension of the backrest 4.

In that the seat area 2 is folded against the backrest 4, and the armrest 6 is folded away downwards, the dimensions of the seat, when viewed in the direction of the seat, are substantially reduced, whereby, for example, if the seat is disposed as a seat of a row of seats of an aircraft, an enlarged traffic region for access to further seats of the same row of seats is provided now. Further, a traffic area of an adjacent corridor may be enlarged, because a person may, for example, enter the space which is emptied by the seat area 2 and the armrest 6, and may, for example, deposit luggage in compartments above or below the seats. In this manner, it is enabled that, although a person is depositing luggage in a compartment, further persons may use the corridor of the aircraft, for example, to reach their seats.

The reference numeral 22 shown in FIG. 1 refers to a damping element as, for example, a gas pressure spring. For example, by provision of this damping element, a movement of the seat area 2 and the armrest 6 may be damped, whereby, for example, a danger that a child gets a hand trapped between the armrest 6 and the seat area 2 is reduced advantageously.

The damping element 22 is disposed between the point 26 and the support element 3. The damping element 22 may, for example, also be disposed between an arbitrary point at the lever 20 and the support structure 10.

By the coupling the armrest 6 to the seat area 2, it is, for example, achieved that the armrest 6 is folded downwards, when a lifting of the seat area 2 takes place, or that the seat area 2 is folded upwards, when a downwards folding of the armrest 6 takes place, respectively. This allows for a one-hand operation of the seat, i.e. a one-hand folding of the armrest 6, and the seat area 2. The provision of the coupling rod 24 at the lever 20, which is coupled to the seat area 2 (wherein the lever 20 may be designed as eccentric disc), with a point the armrest 6, which, with respect to the direction of the seat, is positioned behind the rotational axis 14 of the armrest, causes an inversion of the rotational direction of the seat area 2 and the armrest 6 so that, as shown in FIG. 1, the armrest 6 is rotated counterclockwise and the seat area 2 is folded clockwise against the backrest 4.

Figure 2:
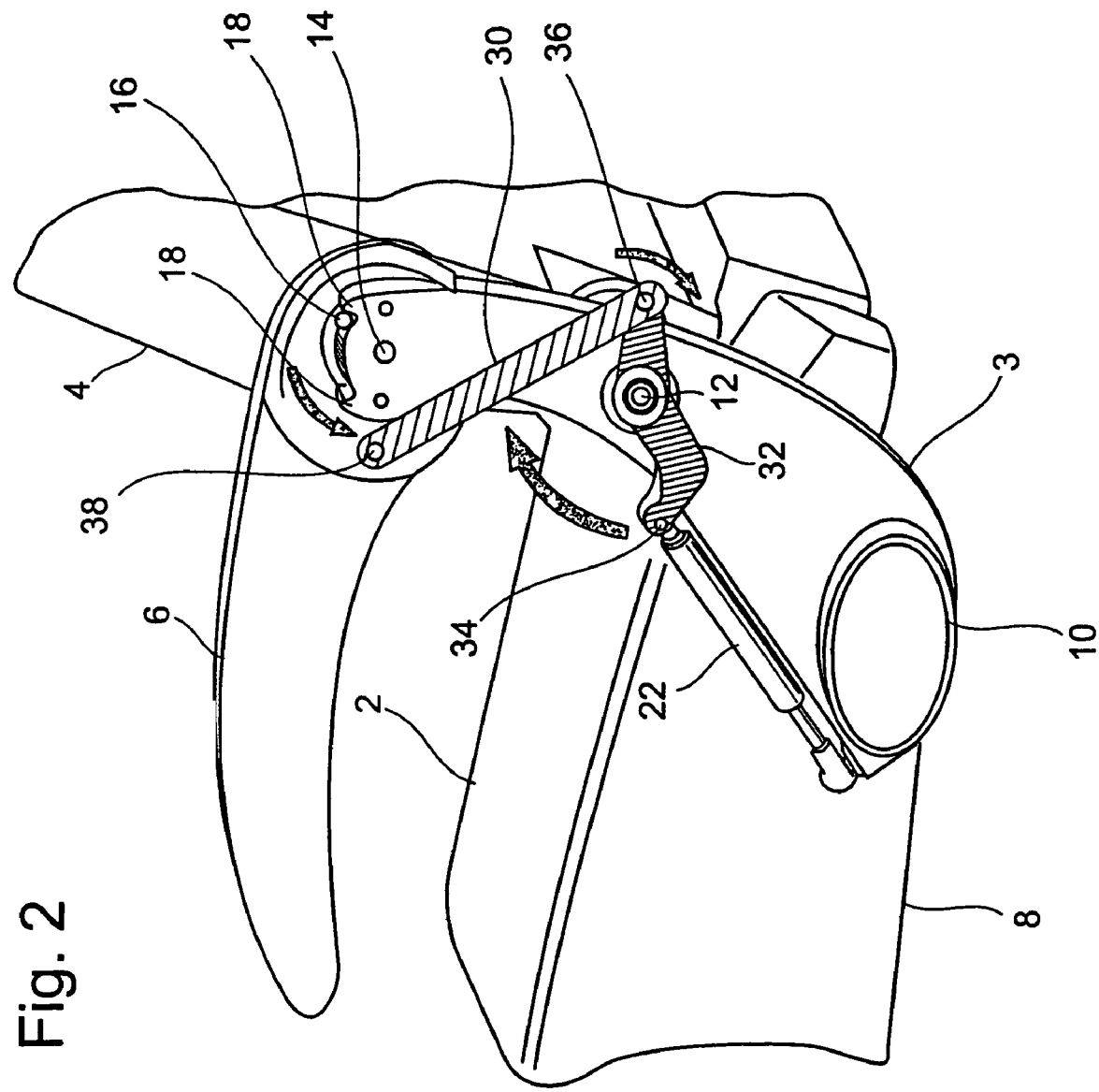
FIG. 2 shows a further three dimensional side view of a second embodiment of a folding seat for an aircraft, according to the present invention.

FIG. 2 shows a further three dimensional side view of a second embodiment of a folding seat, according to the present invention, which is preferably adapted to be disposed in an aircraft. Contrary to the embodiment shown in FIG. 1, a pivoting lever 32 is provided, which is rotatable about the rotational axis 12. At a point 34, one side of the pivoting lever 32 is connected with the damping element 22. For example, the point 34 may be provided with a swivel joint. At a point 36, another side of the pivoting lever 32 is connected with a coupling rod 30. For example, the point 36 may be provided with a swivel joint. At a point 38, the coupling rod is connected with the armrest 6. The point 38 may be provided with a swivel joint. When seen in the direction of the seat, the point 38 is positioned in front of a center of rotation of the armrest 6, i.e. in front of the rotational axis 14 of the armrest 6. If the seat area 2, by means of the lower arrow shown in FIG. 2, is now folded against the backrest 4, point 34 performs, a clockwise rotation about the rotational axis 12. By means of the coupling of the points 38 and 36, the armrest 6 will be folded downwards, when an upwards folding of the seat area 2 takes place. This is shown in FIG. 2 by means of the upper arrow. Contrary to the arrangement shown in FIG. 1, the lower end of the coupling rod 30 is disposed at the point 36 behind the rotational axis 12 of the seat area 2. For this reason, the pivoting lever 32, the front end of which receives the damping element 22, is extended behind the seat areas of the rotational axis 12. The cross-over effect of this coupling is the same, as shown in FIG. 1. A lifting of the seat area 2 causes a downwards folding of the armrest 6. Further, a downwards folding of the armrest 6 causes a lifting of the seat area 2.

Figure 3:
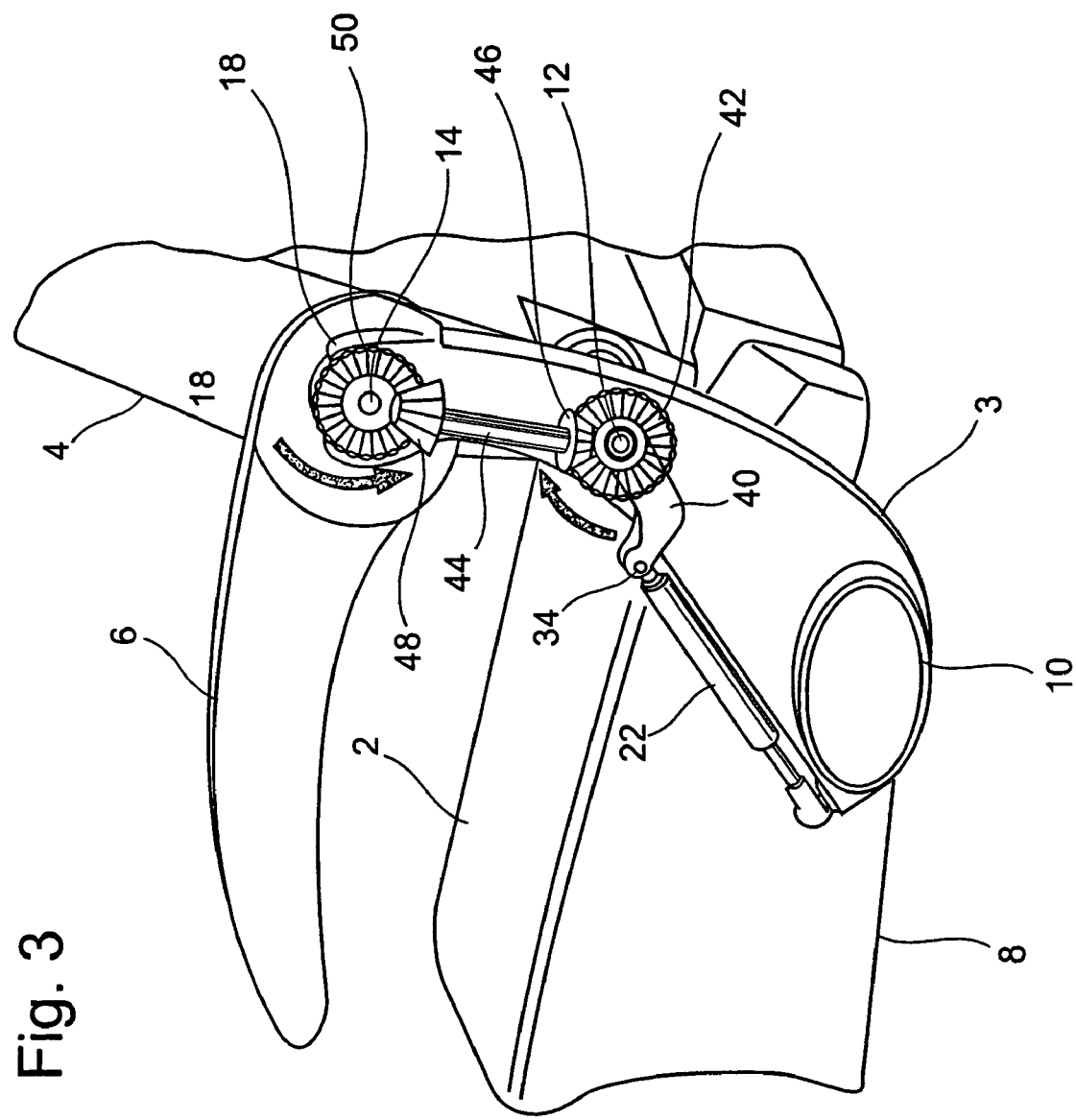
FIG. 3 shows a further three dimensional side view of a third embodiment of a folding seat for an aircraft, according to the present invention.

FIG. 3 shows a further three dimensional side view of a third embodiment of a folding seat according to the present invention. Contrary to the embodiments shown in the FIGS. 1 and 2, in the embodiment shown in FIG. 3 seat area 2, and armrest 6 are connected via a set of bevel gears 42, 46, 48 and 50. The bevel gears 46 and 48 are connected by means of a shaft 44. The bevel gear 42 is coupled to the rotational axis 12 of the seat area 2, and the bevel gear 50 is coupled to the rotational axis 14 of the armrest 6.

Therefore, a rotational movement of the seat area 2 about the rotational axis 12 causes a clockwise rotation of the bevel gear 42. This rotation is transferred to the bevel gear 46 and from the bevel gear 46 is transferred via the shaft 44 to the bevel gear 48, which in turn transfers this rotation into a counterclockwise rotation of the bevel gear 50. Since the bevel gears 42 and 50 are coupled with the respective rotational axes 12 and 14, an upwards folding of the seat area 2 accordingly causes a downwards folding of the armrest 6 and vice versa. The reversal of rotational direction, shown by means of the arrows in FIG. 3, is given, because the bevel gears 42 and 50 are not positioned beyond the rotational axes 12 and 14 of the seat's parts 2 and 6 to be connected, but only connect the facing sectors of the bevel gear 50 of the armrest and the bevel gear 42 the seat area. Advantageously, such a coupling by means of bevel gears may couple rotational axes of armrests and seat areas, where an enlarged distance between the rotational axes 12 and 14 is required.

Figure 4:
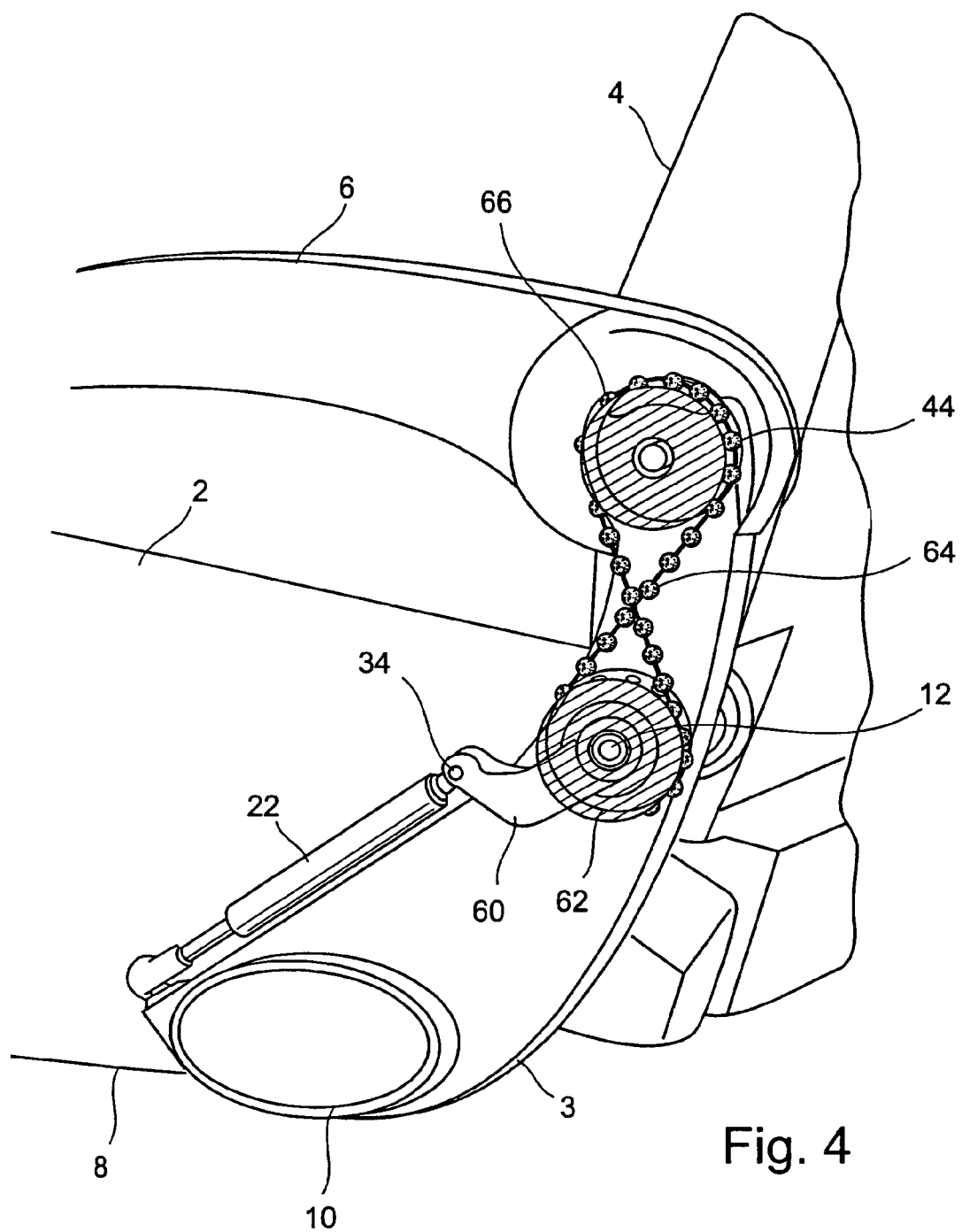
FIG. 4 shows a further three dimensional view of a fourth embodiment of a folding seat for an aircraft, according to the present invention.

FIG. 4 shows a further schematic three dimensional side view of a fourth embodiment of a folding seat according to the present invention. In the embodiment shown in FIG. 4, the seat area 2 and the armrest 6 are coupled by means of a transmission chain 24, being effective in a cross-over way, which cooperates with respective chain wheels 62 and 64 on den rotational axes 12 and 14. A movement of the armrest 6 and the seat area 2 is damped by means of the damping element 22, which, by means of a lever, is coupled to the rotational axis 12. At the point 34, the damping element 22 is connected to the lever 60. The point 34 may for example be provided with a swivel joint. Corresponding transmission chains 24, which allow for a motion-inverting guiding of transmission in form of an eight are, for example, known from drives of stair-elevators for carriage of handicapped. Such transmission chains allow for an inversion about all three spatial axes. Such a transmission chain 64 comprises, for example, a steel cable guided by a hollow rail onto which plastic spheres are provided in regular divisional intervals. In cooperation with the respective indentations in the chain wheels 62 and 66, which may also be referred to as transmission wheels, these plastic spheres provide for the necessary form fit or force closure, respectively. In advantageous manner, the coupling shown in FIG. 4, on account of sliding properties of the spheres, for which, for example, self-smearing plastic material may be used, only needs a minimal smearing and therefore needs to be serviced only to a minor extent.

According to one variant of this embodiment example, in order to avoid a colliding of the spheres at a point of intersection of the eight, guiding rails may be provided (not shown in FIG. 4), which at the same time may serve to secure a tension in the transmission chain 64.

Figure 5:
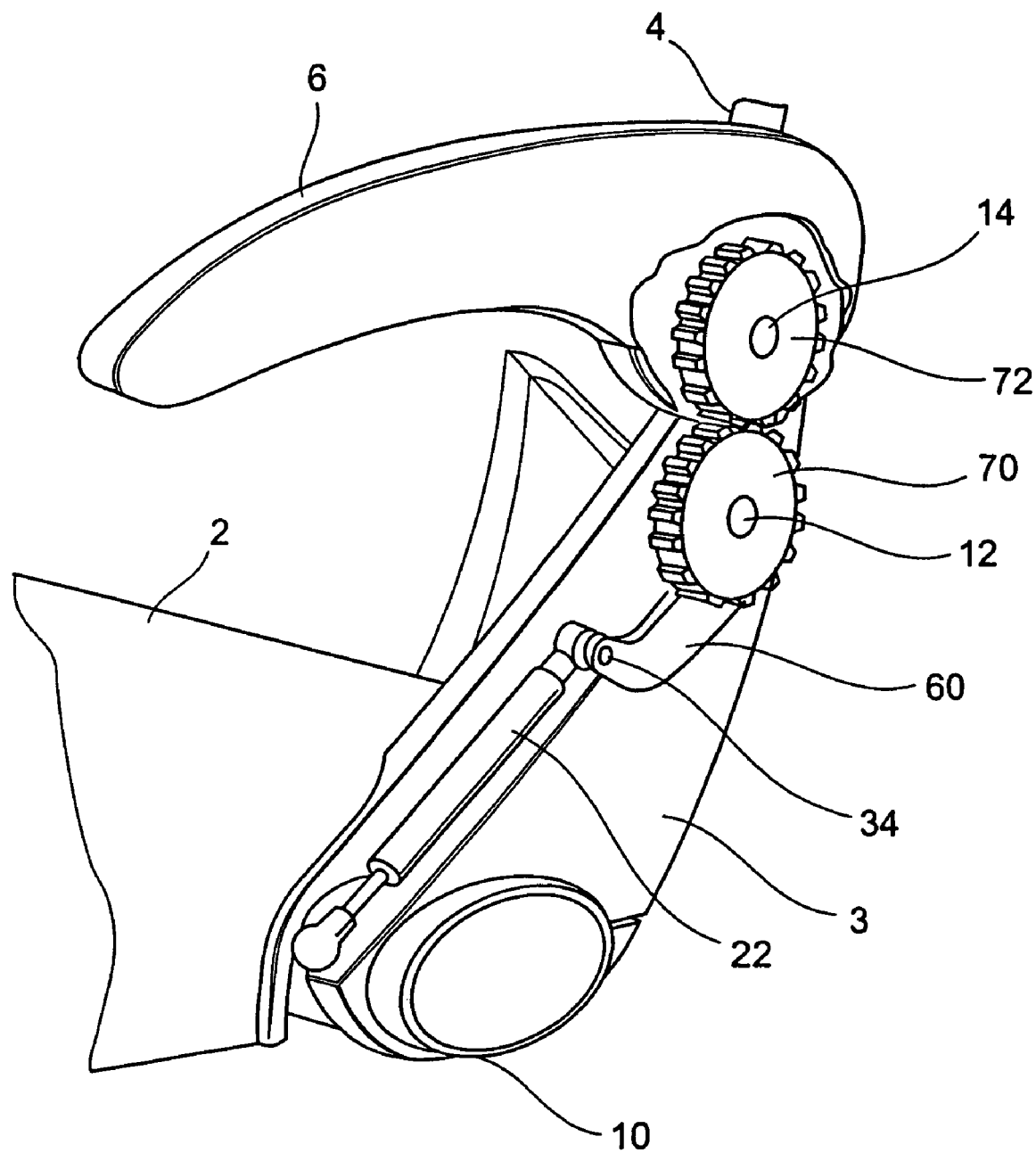
FIG. 5 shows a further schematical three dimensional side view of a fifth embodiment of a folding seat for an aircraft, according to the present invention.

FIG. 5 shows a further schematic three dimensional side view of a folding seat according to a preferred fifth embodiment of the present invention. In the embodiment shown in FIG. 5, the rotational axes 12 and 14 of the armrest 6 and of the seat area 2 are provided with pinions 70 and 72 of equal size, which roll off against each other. According to a variant of the present embodiment, pinions 70 and 72 of different size may be used in order to realize, for example, different rotational angles of the seat area 2 and the armrest 6.

Figure 6:
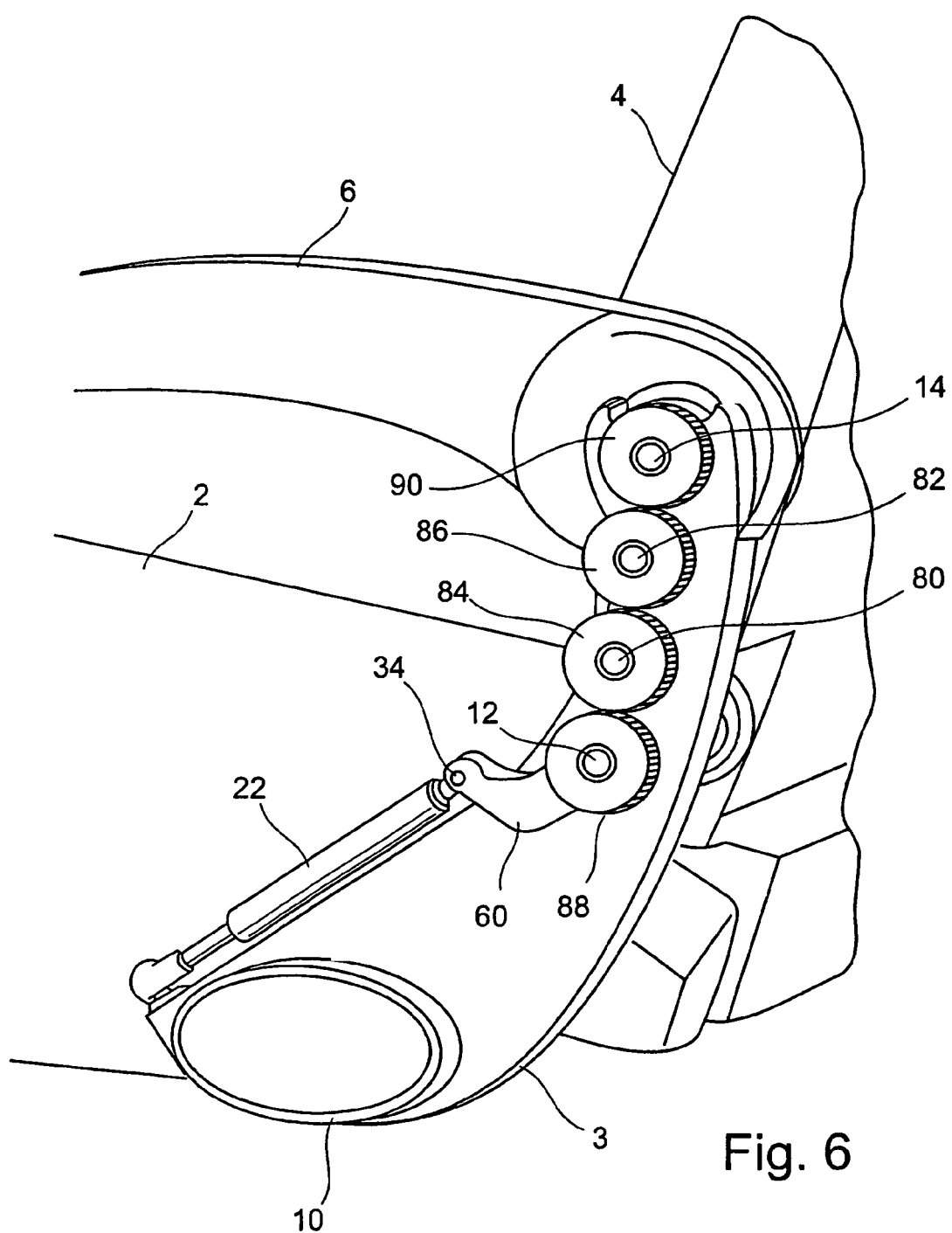
FIG. 6 shows a further schematical three dimensional side view of a sixth embodiment of a folding seat for an aircraft, according to the present invention.

FIG. 6 shows a further schematic three dimensional side view of a sixth embodiment of a folding seat according to the present invention. In this case, contrary to the arrangement shown in FIG. 5, further pinions 84 and 86 are provided at auxiliary axes 80 and 82 between the pinion 90 at the axis 14 and the pinion 88 at the axis 12. The pinions 84, 86, 88 and 90 roll off against each other, respectively, whereby a rotational movement of the axis 12 is turned into an inverse rotational movement of the axis 14. By means of the intermediation of the pinions 84 and 86, a greater distance may be realized between the rotational axes 12 and 14 than is possible for example in the embodiment shown in FIG. 5.

Figure 7:
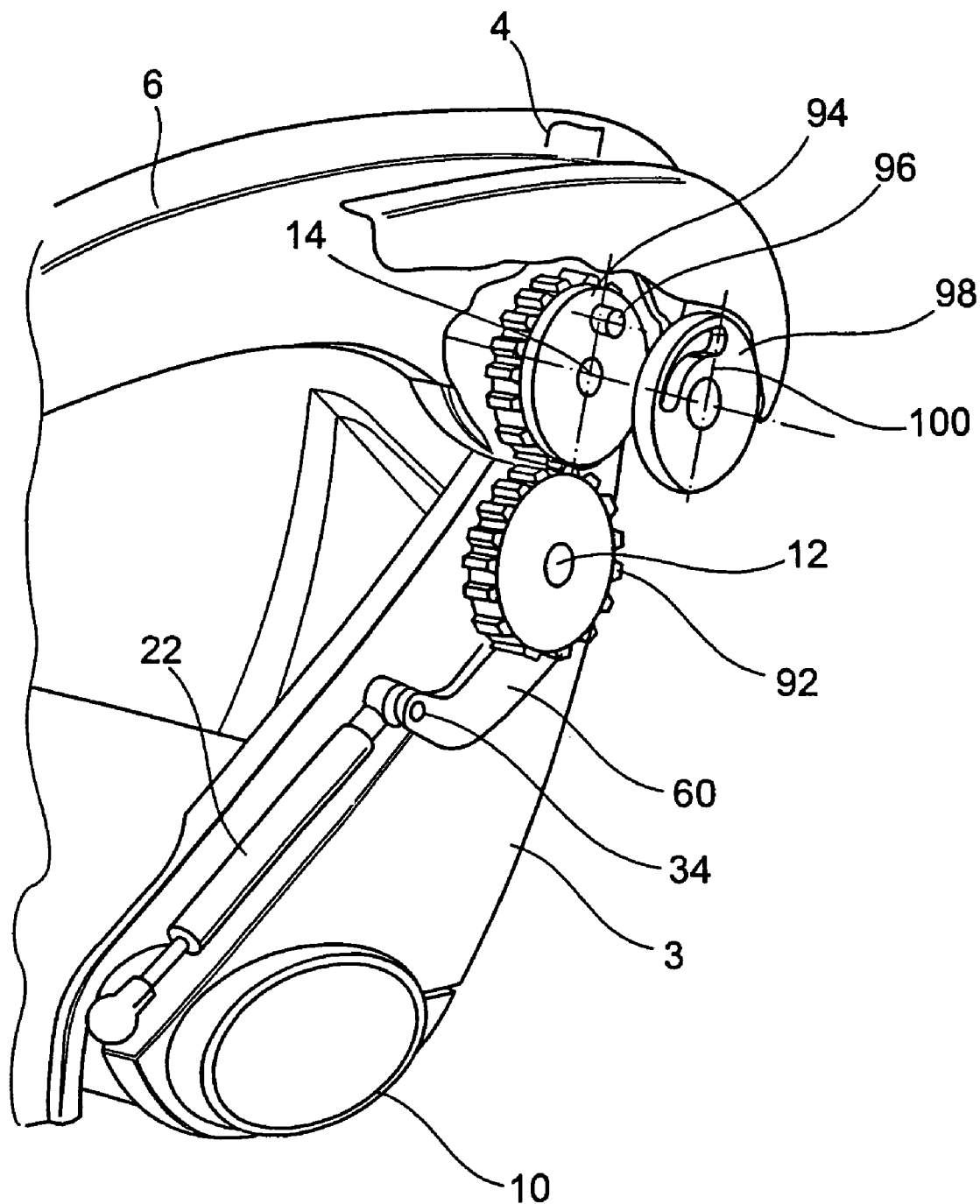
FIG. 7 shows a further schematical three dimensional side view of a seventh embodiment of a folding seat for an aircraft, according to the present invention.

FIG. 7 shows a further schematic three dimensional side view of a seventh embodiment of a seat according to the present invention. Similar to the arrangement shown in FIG. 5, the arrangement shown in FIG. 7 comprises two pinions 92 and 94 at the axes 12 and 14. However, in order to couple the pinion 94 to the armrest 6, a connecting link 98 is provided, which possesses an elongated hole 100, into which a pin 96 at the pinion 94 engages. The pinion or gear 94 turns freely on the rotational axis 14 and is not coupled to the rotational axis 14. The pinion 92 is coupled with the rotational axis 12. The connecting link 98 is fixedly disposed at the rotational axis 14 and coupled to the armrest 6 in this manner. Advantageously, the provision of the connecting link 98 allows the armrest 6 to be pivoted upwards by 90 degrees, when the seat area 2 is folded downwards.

If the seat area 2 is pivoted upwards, when the armrest 6 is in a state in which it is folded upwards, during the upwards folding, the pin 2, and thereby the armrest 6, via one end of the elongated hole of the connecting link are lead to the horizontal position, from where the armrest 6 falls into the vertical pendular position, because there is no brake.

If the seat area 2 is folded upwards when the armrest 6 is in a horizontally state, the pinion 92 which is connected to the rotational axis 12 rolls off the pinion 94, and the pin 96, during the movement, as soon as it reaches one end of the elongated hole 100, takes along the connecting link 98 together with the armrest 6, whereby during upwards folding of the seat area 2 the armrest 6 is folded away downwards. In advantageous manner, this also allows for a course of the movement without a dead point. Moreover, the arrangement shown in FIG. 7 allows an air passenger to fold down the seat area, in order to take seat, and that the armrest is folded out of the vertically downwards directed rest position into the horizontal working position. When the armrest is not needed, it may be folded away upwards. In this respect, for example a friction brake may be provided between the connecting link 98 and the pinion 94.

Figure 8:
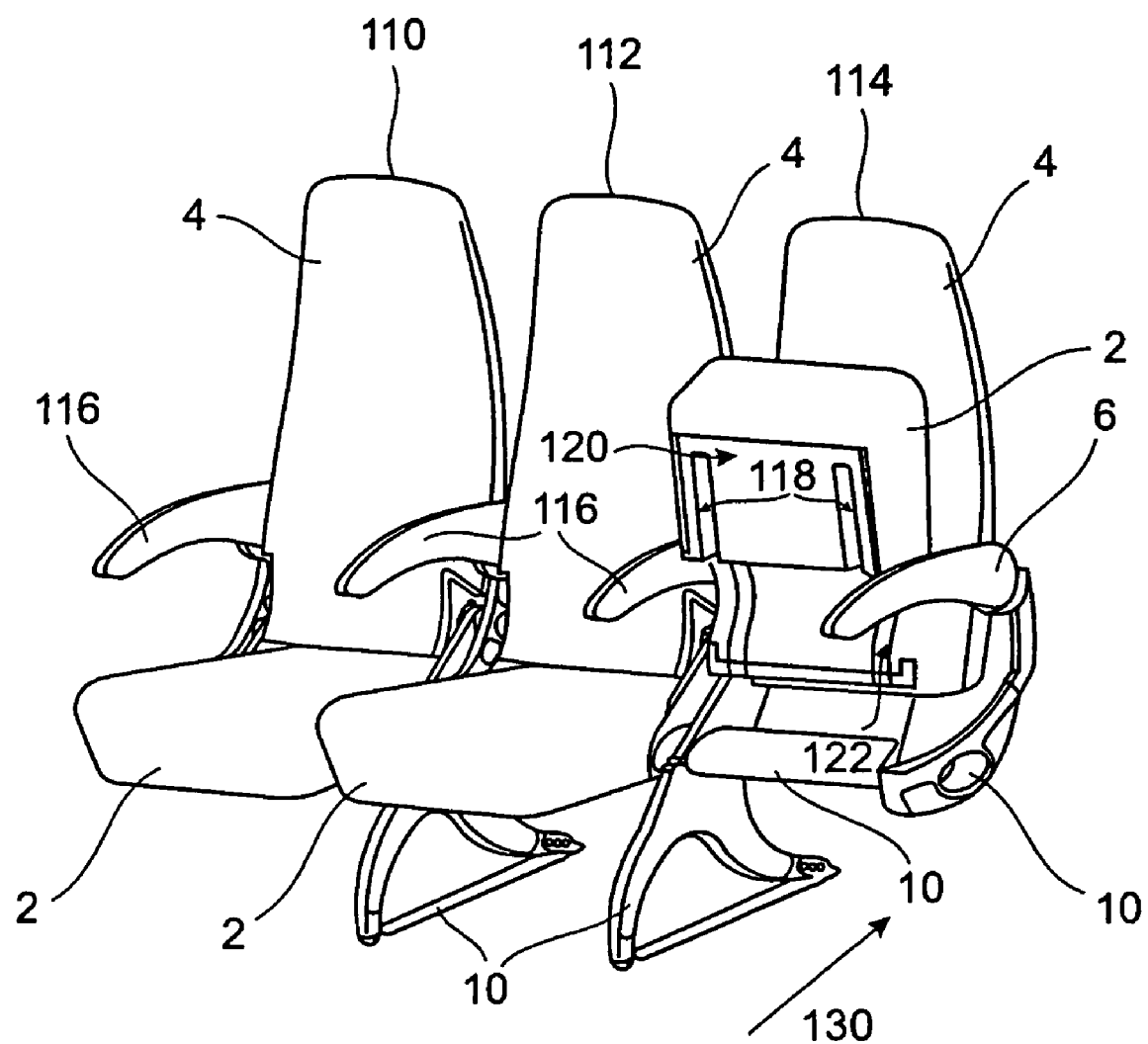
FIG. 8 shows a schematical three dimensional view of a embodiment of a row of seats, according to an embodiment example of the present invention.

FIG. 8 shows a simplified three dimensional view of a row of seats according to an embodiment of the present invention. As may be seen in FIG. 8, the row of seats has three single seats 110, 112 and 114, the row of seats having stiff armrests 116. According to the present invention, only the armrest 6, being close to the corridor 130 of the aircraft is coupled to the seat area 2 in such a way that, during an upwards folding of the seat area 2, the armrest 6 may be pivoted away downwards. In the embodiment shown in FIG. 8, the seat area 2 and the armrest 6 are not rigidly coupled. I.e., an upwards folding of the seat area 2, as shown in FIG. 8, does not automatically cause a downwards pivoting away of the armrest 6 in the vertically downwards directed rest position. On the other hand, by means of an upwards folding of the seat area 2, a locking of the armrest 6 is released so that the armrest 6 in the position shown in FIG. 8 may be folded away downwards, simply by operation of an operating person.

At a lower side of the seat area 2, recesses 18 are provided, which are for example adapted to the contour of the support structure 10. A lower side of the seat area 2 may, for example, be referred to as seat-box 120.

According to a further embodiment of the present invention, the seat area 2 may, for example, be biased by means of a spring so that the seat area 2 is automatically folded against the seatback 4, when a person rises up from the seat area 2. According to the present invention, the armrest 6 is then automatically folded away downwards, into the vertical rest position.

The armrests may each possess a mechanics as shown in the FIGS. 1 to 7.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. A folding seat for an aircraft, comprising:
   a backrest;
   a seat member;
   an armrest; and
   a support structure;
   wherein the seat member is pivotably attached to the support structure about a first rotational axis;
   wherein the armrest is pivotably attached to the support structure about a second rotational axis;
   wherein the seat member and armrest are coupled by coupling elements comprising four bevel gears, wherein cooperation between the four bevel gears causes the armrest to pivot to a folded position when the seat member is pivoted upwards;
   wherein the four bevel gears include
   a first bevel gear coupled to the first rotational axis of the seat member;
   a second bevel gear engaging the first bevel gear and having a third rotational axis;
   a third bevel gear having the same rotational axis as the second bevel gear and coupled to the second bevel gear by a shaft; and
   a fourth bevel gear engaging the third bevel gear and coupled to the second rotational axis of the armrest.

2. A folding seat according to claim 1,
   wherein the seat member may be pivoted upwards against the backrest; and
   wherein a pivoting of the seat member against the backrest causes a downwards folding of the armrest.

3. A folding seat according to claim 1,
   wherein the seat member and the armrest are coupled in a manner such that one single hand grip is necessary for pivoting the seat member and the armrest.

4. A folding seat according to claim 1,
   wherein the folding seat is adapted to be disposed at a corridor in an aircraft; and
   wherein the armrest is provided at a side of the folding seat which faces the corridor.

5. A folding seat according to claim 1,
   wherein the folding seat is adapted to be part of a seat group for a passenger cabin of an aircraft.

6. A folding seat according to claim 1,
   wherein the armrest is disposed in such a way that the armrest is aligned substantially in parallel to a longitudinal direction of the aircraft, when the folding seat is disposed in a passenger cabin of an aircraft.

7. A folding seat according to claim 1,
   wherein the folding seat is designed for an aircraft;
   wherein furthermore a damping element is provided, which is coupled to the first bevel gear and the support structure and which damps a movement of the seat member and the arm rest.

\* \* \* \* \*